United States Patent [19]
Wartman

[11] 3,843,589
[45] Oct. 22, 1974

[54] STABLE PUMPABLE SLURRIES OF ETHYLENE OXIDE POLYMERS

[75] Inventor: Lloyd Henry Wartman, Westport, Colo.

[73] Assignee: Union Carbide Corporation, New York, N.Y.

[22] Filed: Feb. 5, 1973

[21] Appl. No.: 329,308

[52] U.S. Cl. .......... 260/33.4 R, 260/37 AL, 137/13
[51] Int. Cl. .......................... C08f 45/34, F17d 1/16
[58] Field of Search.......... 137/13; 260/33.4 R, 34.2

[56] References Cited
UNITED STATES PATENTS

| | | | |
|---|---|---|---|
| 2,854,346 | 9/1958 | Todd | 106/290 |
| 3,720,216 | 3/1973 | Wartman et al. | 137/13 |

Primary Examiner—Morris Liebman
Assistant Examiner—S. L. Fox
Attorney, Agent, or Firm—J. Hart Evans

[57] ABSTRACT

This invention relates to stable pumpable slurries of ethylene oxide polymers in liquid media, which comprise (a) particulate ethylene oxide polymer, having a density of about 1.15 to about 1.26, (b) an inert liquid vehicle which is a non-solvent for said ethylene oxide polymer and having a density of about 96.5 percent–103.5 percent of the density of said particulate ethylene oxide polymer. The vehicle is a mixture of two mutually soluble liquids or a solution of a solid in a liquid provided that it is a non-solvent for the ethylene oxide polymer and is miscible in water. The volume of liquid vehicle used per unit volume of polymer powder exceeds the void volume of the ethylene oxide polymer by at least 3 percent but by not more than 500 percent.

12 Claims, No Drawings

STABLE PUMPABLE SLURRIES OF ETHYLENE OXIDE POLYMERS

This invention relates to slurries of ethylene oxide polymers which are both stable and pumpable and more particularly to stable, pumpable slurries of poly(ethylene oxide) in liquid media. In another aspect, the invention relates to improved drag reduction formulations or systems which are effective for reducing the dynamic drag of turbulent fluid in contact with a surface, and which are characterized by their excellent stability, improved pourability and pumpability.

The term "drag reduction," as it is known in the art, is the increase in the volumetric flow rate of a fluid at a constant pressure drop due to the addition, usually of a small amount, e.g., a couple of hundred ppm or less, of a solid linear, polymeric material of relatively high molecular weight. Such material is known as the "drag reducing agent." Throughout this specification the drag reducing agent will also be referred to as the "active polymer" or the "ethylene oxide polymer."

The term "hydrodynamic drag reducing efficiency" (hereinafter oftentimes referred to as "efficiency") is measured as the per cent increase in the flow of treated tap water (contains the hydrodynamic drag reducing agent) relative to the flow rate of untreaded tap water (lacks the hydrodynamic drag reducing agent).

In recent years, considerable interest has been shown in the phenomenon of drag reduction in water under turbulent flow conditions caused by the addition of certain water soluble polymers. One approach utilized concentrated aqueous solutions of drag reducing polymers as stock solutions. In general, such polymers were of rather high molecular weights and, when dissolved at concentrations in excess of one weight per cent, formed extremely viscous, almost gelatinous aqueous solutions. By way of illustration, extremely viscous aqueous solutions containing from about 1.0 to about 2 weight per cent of poly(ethylene oxide) which has an average molecular weight of approximately 4,000,000 can be proportioned into a flowing stream of water at such a rate to achieve an effective dosage of about 50 ppm. Through such drag reducing aqueous stock solutions offer proportionation convenience, they also present serious disadvantages. Such disadvantages include low concentrations of active polymer, i.e., poly(ethylene oxide), because of viscosity limitations; large storage capacity in light of the minimal amount of active polymer dissolved therein; susceptibility of the active polymer to undergo mechanical shear during pumpimg thereby resulting in a loss of hydrodynamic drag reducing efficiency; and susceptibility of the active polymer to oxidative degradation in water solution which also leads to less hydrodynamic drag reducing efficiencies.

In view of the disadvantages inherent in the aqueous solution technique, the so-called "slurry" or "dispersion" approach was very recently developed. This approach has met with varying degrees of success. It involves suspending, at least temporarily, the polymeric drag reducing agent in particulate form in an organic vehicle in order to obtain a formulation having a more concentrated form of the drag reducing agent. Unfortunately, however, the dispersed material, i.e., the drag reducing agent contained in the organic vehicle has a tendency to "settle" under the influence of gravitational forces and for this reason, the art has increased the viscosity or gel strength either by using high polymer loadings or by adding a thickener such as colloidal silica to the formulation.

It has been found that although stratification resistance could be achieved at the expense of appreciably high viscosity, very often, pourabiity, pumpability and general handling characteristics of the slurry or dispersion were adversely affected by this high viscosity. The required high viscosity was usually achieved either by limiting the formulation to a level of active polymeric friction reducing agent in excess of that required for efficient operation, per se, or by the incorporation of such levels of thickening agent as to cause problems with dissolving rates, foaming and the like.

Another problem incident to the use of prior art slurries is that which has been attributed to accidental heating which often occurs during pumping, storgage or use of the slurry. For example, when employing the well-known propylene glycol as the vehicle containing the poly(ethylene oxide) as the friction reducing agent, there occurs an irreversible gelation of the polymer at about 120°F. as the individual particles are fused into large aggregates. This causes blockage of feed lines, valves, etc.

It is therefore an object of the present invention to provide stable slurries of ethylene oxide polymers in liquid media.

Another object is to provide stable slurries of ethylene oxide polymers which are readily pumped against a pressure head using conventional positive displacement pumps such as a moyno or a gear pump.

Another object is to provide stable slurries of ethylene oxide polymers that are characterized by a high degree of fluidity thereby permitting enhanced pourability, and improved general handling characteristics.

Another object is to provide slurries of poly(ethylene oxide) which are less prone to blockage from thermogelation during pumping operations.

Still another object is to provide stable slurries of poly(ethylene oxide) which require significantly reduced levels of thickening agent.

A further object of the present invention is to provide a novel hydrodynamic drag reducing system that has improved handling characteristics such as pumpability, pourability and/or stratification resistance without suffering concurrent changes in hydrodynamic drag reducing efficiency, that is, in its ability to reduce to hydrodynamic drag of water undergoing turbulent flow.

Broadly contemplated, the invention provides improved slurries of ethylene oxide polymer which comprise (a) particulate water-soluble ethylene oxide polymer which has an average molecular weight greater than about 500,000 and a density of about 1.15 to about 1.26, (b) an inert liquid vehicle which is a non-solvent for said ethylene oxide polymer, said vehicle being a mixture of at least two mutually soluble liquids or a solution of a solid in a liquid, characterized in that the density of the liquid vehicle is from about 96.5–103.5 percent of the density of said ethylene oxide polymer, said vehicle being present at a total volume per unit volume of polymer powder which exceeds the void volume of said ethylene oxide polymer by at least 3 percent but by less than 500 percent preferably by at least 45 percent but by not more than 350 percent and (c) a thickening agent which is non-reactive with said ethylene oxide polymer and said liquid vehicle and which is employed in an amount of about 0 percent to about 3 ½ percent based on the weight of the slurry formulation.

As employed herein the following terms shall have the following meanings or characteristics.

*True Density* — This corresponds to the density of poly(ethylene oxide) free of voids and imperfections and is from about 1.15 to about 1.26 grams per milliliter. The true density can be determined by the Archimedian principle.

*Apparent Density* — The apparent density generally ranges from about 0.30 to about 0.45 grams per milliliter. It is density observed for the particulate form of the polymer. It is much lower than the true density because of void volume, imperfections, etc.

*Void Volume* — Can be calculated from true and apparent density. It is expressed as milliliters of void per gram of particulate polyethylene oxide. For example, poly(ethylene oxide) having a true density of 1.117 grams/milliliter and an apparent density of 0.35 gr/ml has a void volume of 1.99 ml/gr.

Illustrative of the ethylene oxide polymers, oftentimes referred to herein as the "active polymer" or "drag reducing agent," which are contemplated in the novel systems include homopolymers of ethylene oxide and copolymers of ethylene oxide with one or more polymerizable olefin monoxide comonomers. Since the ethylene oxide polymers must be water-soluble, a realistic limitation is thus placed on the amount of olefin oxide monomer that can be contained in such polymers. The olefin oxide comonomers have a sole vicinal-epoxy group, i.e.,

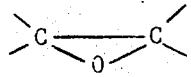

group, and they are illustrated by 1,2-propylene oxide, 2,3-butylene oxide, 1,2-butylene oxide, styrene oxide, 2,3-epoxyhexane, 1,2-epoxyoctane, butadiene monoxide, cyclohexene monoxide, epichlorohydrin, and the like. Desirable water-soluble ethylene oxide polymers include poly(ethylene oxide) and copolymers of ethylene oxide, butylene oxide, and/or styrene oxide, for example, copolymers which contain upwards to about 15 weight per cent of the olefin oxide comonomer. It should be noted that the term "copolymer" is used in its generic sense, that is, a polymer formed via the polymerization of two or more polymerizable monomers. Poly(ethylene oxide) and copolymers of ethylene oxide with propylene oxide are preferred. From standpoints of price, commercial availability, performance and effectiveness as a hydrodynamic drag reducing agent poly(ethylene oxide) is the active polymer of choice. The preparation of the ethylene oxide polymers is well documented in the literature, e.g., U.S. Pat. Nos. 2,969,403; 3,037,943; and 3,167,519.

The particulate ethylene oxide polymer has an average molecular weight greater than about 500,000, and desirably from about 1,000,000 to about 12,000,000. Depending upon a correlation of factors such as the type and concentration of active polymer, the nature of the liquid vehicle and thickening agent, etc., maximum hydrodynamic drag reducing efficiency can be obtained by employing active polymers which have an average molecular weight range of from about 2,000,000 to about 10,000,000. Desirably, the particulate ethylene oxide polymer has a particle size distribution of which at least about 85 weight per cent passes through a 20 mesh screen. Preferably, the particle size distribution of the ethylene oxide polymer is such that at least 85 weight per cent passes through a 20 mesh screen and at least 10 weight per cent passes through a 60 mesh screen. Extremely effective results have been obtained by using active polymer of which at least about 95 weight per cent and upwards from about 98 weight per cent, pass through a 20 mesh screen and at least 45 weight per cent pass through an 80 mesh screen.

The invention also embraces novel formulations which exhibit a "staggered dissolving" or "controlled dissolving" characteristic by virtue of the active polymer being comprised of or formed from blends of varying molecular weight fractions and/or particle sizes. This characteristic is useful in applications which requires a substantially constant level of performance efficiency over an extended period of time such as, for example, in reducing the hydrodynamic drag of turbulent water in a conduit. Those active polymer species of relatively lower molecular weight and/or finer particle size dissolve more quickly in the turbulent water and provide a relatively high level of drag reduction efficiency over the first sections of the conduit. However, once fully dissolved and performing as a hydrodynamic drag reducing agent, these dissolved species of active polymer can undergo mechanical shear degradation thereby becoming less efficient downstream. Such loss in efficiency is compensated for by the dissolving of fresh active polymer from the slower dissolving particles that are more coarse, i.e., of lesser surface area, and/or are of relatively higher molecular weight. By utilizing a source of active polymer which has a spectrum of particle size and/or molecular weights, as indicated previously, a continuous supply of freshly dissolved polymer can be provided throughout the length of the conduit. The hydrophilicity characteristic of the active polymer can be altered by varying the amount of olefin oxide comonomer polymerized therein. Blends of active polymer which have different degrees of water solubility due to their chemical structure can also be used to obtain this "staggered dissolving" effect.

As a general rule, the upper limit of polymer concentration is determined by the quantity of vehicle required to fill the interstitial voids in the bulk polymer. Poly(ethylene oxide) particles are small and irregular in shape. When the polymer is poured into a container, it occupies much more space than would be expected from its density. This is an inherent property of materials in particulate form. ASTM D1895 describes methods for measuring the "apparent density" which is defined as the weight per unit volume of a material including voids in the material as tested. This method was used to measure apparent density of the polymers studied. The true density can be determined by the method described in Example I. Void volume can be calculated from the true and apparent densities as previously described.

As normally manufactured poly(ethylene oxide) ranges in apparent density from about 0.30 gr/ml to 0.45 gr/ml. The actual solid density of the particles may range from 1.15 to 1.26 but generally averages about 1.20. Hence, as the apparent density ranges from 0.30 to 0.45 gr/ml, the void volume in one gram of particulate polymer ranges from 2.51 to 1.39 ml.

A minimum condition for fluidity in the mixture of vehicle and polymer is that the entire void volume be filled with vehicle. As shown above, this void volume is dependent upon apparent density and is therefore best established by actual experiment. It is preferred to use a volume of vehicle in excess of the amount required to saturate the voids. How much excess vehicle should be employed must be determined by actual experiment. Probably the most critical operation to which the slurries are subjected is pumping against a head pressure using some type of positive displacement pump. All types of positive displacement pumps such as gear pumps, moyno pumps, and diaphram pumps utilize valves or other devices which provide a sealing action to minimize back-flow of the material pumped. Gear pumps have a finite clearance between the gears and the body, and moyno pumps between the rotor and stator. In diaphram or piston pumps, which utilize valves, seating of the valves is not perfect and some back-flow can take place between the seat and the valve. When any of these type pumps is used to pump a slurry, the solid particles are generally too large to pass through the clearance. On the other hand, the liquid carrier medium is free to flow, albeit slowly, through the clearance. When pumping against a pressure head, the liquid carrier medium flows back through the clearance while the particles are not free to do so. The phenomenon of synaeresis results. For example, the forward chambers of a moyno pump become filled with semi-dry polymer due to the backflow of the liquid carrier medium. The pump binds, stalls and flow stops.

This deficiency is especially apparent when the slurries are pumped at higher temperatures. The viscosity of the liquid carrier medium decreases with increasing temperature and backflow problems are aggravated because the carrier medium flows more readily through the pump clearances.

Excess vehicle provides a margin of safety during pumping. Loss of back-flow of a vehicle is less likely to lead to a dry, non-flowable condition if the vehicle content exceeds the amount required to fill the void volume by a greater percentage.

The liquid vehicles which are applicable in the practice of the invention are mixtures of inert, water-miscible compounds which are a non-solvent for the active polymer and which are combined in a manner such that the resulting density of the mixture (or solution) is 96.5–103.5 percent of the density of the ethylene oxide polymer, preferably 98–102 percent of the density and most preferably of a matched density, i.e., about 100 percent of the density of the ethylene oxide polymer.

Preferably, one or more of the constituents of the liquid vehicle has a density lower then the density of the ethylene oxide polymer whereas one or more of the constituents has a density higher than the density of the ethylene oxide polymer. Thus, proportionable amounts of the constituents of the liquid vehicle can be admixed so that the resulting density is about 96.5 to about 103.5 percent of the density of the ethylene oxide polymer.

Examples of constituents of the liquid vehicle having a density lower than the ethylene oxide polymer include alkanediols such as propylene glycol, 1,3-butylene glycol, 1,6-hexylene glycol, ethylene glycol, 2-methylpentane-2,4-diol, octane-1,2-diol, dipropylene glycol, butane diol, butane triol, hexane triol, poly(ethylene oxides) of molecular weight of about 200 to about 600, and water-soluble liquid poly(alkylene oxides) of about 200 to about 20,000 molecular weight.

Examples of the constituent of the liquid vehicle having a density higher than the ethylene oxide polymer include polyhydroxy compounds such as glycerine, 1,2,3,4,5,6 hexane hexol, erythritol (1,2,3,4 butane tetrol), pentaerythritol, ethylene carbonate and ethylene chlorohydrin. Some compounds such as pentaerythritol and ethylene carbonate are solid at room temperature but can be employed when sufficient amounts of the constituent of lower density are employed.

Propylene glycol as one of the constituents of the admixture is preferred since its $LD_{50}$ value is 26.3 whereas the $LD_{50}$ value of, for example, polypropylene glycol (of about 400–425 average molecular weight) is about 2.5. The expression "$LD_{50}$" as used herein represents the lethal nature of a single oral dosage of grams of organic vehicle per kilogram of animal (rat) body weight necessary to kill 50 per cent of such animals. Propylene glycol is "generally recognized as safe" (GRAS) for use in foods intended for human consumption and is widely used in cosmetics and in medical ointments for skin applications in accordance with the Food, Drug and Cosmetics Act. Such relatively low toxicity and general acceptance by an important agency of the United States Government makes novel systems based on propylene glycol as one of the constituents of the admixture extremely attractive especially in drag reduction applications such as irrigation and fire-fighting which utilize a potable water source without fear of contaminating said potable water source of causing extensive injury or damage to personnel occasioned by spillage, spray, etc., of the propylene glycol-based system. For the foregoing reasons and in view of the fact that propylene glycol is a commodity chemical, is very inexpensive, and is biodegradable make novel systems on mixtures of propylene glycol, highly preferred (especially from pollution, ecological, and health standpoints).

Systems particularly suitable as vehicles include solutions of $K_2HPO_4$ in ethylene glycol, as well as mixtures of glycerol with propylene glycol. Mixtures of glycerol with propylene glycol are preferred since the system has economic and toxicity advantages. As shown in the examples, the measured density of one lot of poly(ethylene oxide) particles is 1.177 grams/ml as measured at 20°C. It is to be understood, however, that the density of poly(ethylene oxide) has been reported in the art to range from 1.15 to 1.26 because of imperfections in the crystal lattice, entrained air and impurities etc. Hence, it is preferred to match the liquid vehicle density to an experimentally determined value for the polymer particle. Since glycerol has a density at 20°C. of 1.260, and propylene glycol, a density of 1.040, it can be calculated that a mixture containing 38 parts by volume of propylene glycol and 62 parts by volume of glycerol should have an equal density. However, the invention is operable outside this range to some degree. A range of 5–50 parts of propylene glycol and 50–95 parts glycerol is operable, the selection of ranges being based on the requirement that the resulting density be within the range of about 96.5–103.5 percent of the experimentally determined density value of the ethylene oxide polymer to be dispersed.

Other vehicles based on mixtures of inert water-miscible compounds include:

dipropylene glycol + 1,2,3,4,5,6 hexane hexol, 1,3-butylene glycol + glycerol,
1,6-hexylene glycol + 1,2,3,4,5,6 hexane hexol and
2-methylpentane-2,4diol + ethylene carbonate.

It is, of course, understood that these mixtures are admixed in a manner such that the resulting density is about 96.5 to 103.5 percent of the density of the ethylene oxide polymer, preferably 98 percent to 102 percent and most preferably about 100 percent.

The concentration of liquid vehicle is determined by the considerations previously mentioned. If the concentration is too low, difficulties with pumping are encountered. On the other hand, too high a concentration of vehicle can lead to segregation and stratification of the slurry on standing provided there is no exact density match between all polymer particles and the vehicle. The optimum vehicle concentration is best expressed in terms of the excess vehicle required over and above that needed to fill the void volume of the polymer. This strategem is necessary because polymer samples vary in apparent density and consequently, in void volume. A polymer with a large void volume requires more vehicle than a polymer with low void volume. The volume of liquid vehicle per unit volume of polymer powder is recommended on the basis of the data available, to exceed the void volume by a minimum of 3 percent. The maximum liquid volume should not exceed the void volume by more tha 500 percent if good stratification resistance is desired without resorting to higher levels of thickening agent.

The liquid vehicles of choice give novel systems which unexpectedly exhibit high resistance to stratification and molecular weight degradation of the active polymer, and which allow for changes in rheologies in order to improve their handling characteristics without suffering any appreciable concurrent changes in their markedly high hydrodynamic drag reducing efficiencies. Such novel systems exhibit a favorable balance of handling characteristics. They are quickly dispersible in and rapidly dissolvable in a turbulent stream of aqueous fluid; they are resistant to "caking" or drying out effects when inadvertently exposed to the atmosphere, for example, during application; and they can be stored in hot geographical areas or warehouses prior to application without fear of ignition or explosion due to the vapors from the liquid vehicle.

When slurries of poly(ethylene oxide) are pumped, frictional or other sources of heating are of concern since the slurry may irreversibly gel at the melting point of the polymer. The melting point of the pure polymer is about 150°F., however when dispersed in a liquid, melting and/or fusion of the polymer particles may occur at significantly lower temperatures as the heated carrier liquid begins to appreciably dissolve the polymer. When propylene glycol is the liquid vehicle, slurries of poly(ethylene oxide) gel at 120°F., when glycerine is the liquid vehicle, slurries of poly(ethylene oxide) gel at 138°F., i.e., some 18° higher. Hence the use of a glycerine/propylene glycol mixed vehicle allows a greater margin of safety from gelation due to frictional or other heating. This advantage can be of great significance when it is used with reduced polymer loading that provides excess liquid vehicle to minimize the rate of frictional heating and better separate gelled particles.

The third component contained in the novel systems is the thickening agent. The thickening agent is compatible in the system and non-reactive with the liquid vehicle, or active polymer. Small amount (of the thickening agent) should have the ability to greatly thicken the liquid vehicle and/or to coat the active polymer thereby helping to prevent stratification of the active polymer over extended periods of time. The thickening agents can be exemplified by high molecular weight organic polymers which are soluble in the liquid vehicle; and the organic and inorganic solid materials which are insoluble in the liquid vehicle, which are characterized by high surface areas, e.g., about 100 square meters per gram, and which have the ability to form aggregated structures. The latter materials may often be referred to as thixotropic agents. Examples of typical thickening agents include colloidal silica, colloidal silica-alumina mixtures, chrysotile asbestos, colloidal clays such as montmorillonite, modified clays of the magnesium aluminum silicate mineral types, microcrystalline asbestos, microcrystalline nylon, hydroxypropylcellulose, propylene glycol derivative of alginic acid, polyvinylpyrrolidone, and others readily apparent to those skilled in the art.

By the utilization of the matched density concept of the present invention, the need to promote stability on the basis of an incorporated thickening agent is clearly reduced and in fact in some cases completely eliminated. However, to insure stability, it is sometimes advantageous to incorporate very low concentrations of this thickening agent. Two instances representing the advantages of using both the matched density concept and an incorporated thickening agent are (a) when it is desired to use a specific lot of poly(ethylene oxide) which has been found to contain a distribution of densities because of variations of degrees of crystallinity and imperfections within the particles; and (b) when it is expected that the slurry will be exposed to a wide range of temperatures wherein the density match at ambient temperature is no longer maintained. In these instances, when both the density match and incorporated thickener are used, the fluidity of the resultant system is much greater than seen in the prior art. It is apparent that no hard and fast rule can be set down to fix numerical limits regarding the concentration of thickening agent to be employed in the novel systems. Indeed, quite often, the need for a thickening agent in the system is eliminated. In those instances where a thickener is required to insure stability, the amount employed is frequently reduced by about 80 percent or more relative to prior art formulations having comparable stability. Furthermore, the fluidity of the formulations are much improved. Thus, taking into consideration the influences described previously, the concentration of the thickening agent can range from about 0 to about 3 ½ weight per cent, based on the total weight of the novel system.

The novel formulations can contain ingredients other than the polymeric drag reducing agent, liquid vehicle and optionally the thickening agent. Such additional ingredients can be called upon to perform any one of a multiplicity of functions depending upon the intended handling technique or end use.

Additional components that can be contained in the novel formulations include stabilizers which are capable of arresting degradation or depolymerization of the polymeric drag reducing agent during storage. Such stabilizers may include ultraviolet screening agent, e.g., the benzotriazoles, the phenyl salicylates, etc.; antioxidants such as the phenothiazines; 2-hydroxypropylethylenediamine, thiourea, 2-mercaptomethylimidazole, phenylalpha-naphthylamine, 2,6-di-t-butyl-3-methylphenol, etc.

If desired, dyes can be incorporated into the novel formulations. This expediency offers a convenient mechanism for visually following the amount of drag reducing agent that has been proportioned, for example, into the conduit. In many instances, the use of dyes will indicate the rate of dispersion of the polymeric drag reducing agent in the aqueous medium and oftentimes illustrate changes in flow patterns and suppressed turbulence arising from such use. Examples of suitable dyes include Rhodamine B, Alphazurine FGND, fluorescein, vegetable dyes, etc. Any one of many dyes can be employed provided that it is compatible with the other components of the novel formulation. Other ingredients which can be incorporated into the novel system are corrosion inhibitors designed to protect the metal storage container and to keep the proportionation hardware, lines, metering devices and ejection ports free from rust and corrosion. Such inhibitors depend, to a large degree, upon the type of metal to be protected. Examples include the phosphate and the borate buffered systems.

The following Examples will illustrate the present invention.

EXAMPLE I

DETERMINATION OF THE DENSITY OF POLY(ETHYLENE OXIDE)

A saturated solution of $K_2HPO_4$ in ethylene glycol was made at room temperature. The densities of the solution and of pure ethylene glycol were measured using a pycnometer. The solution was found to have a density of 1,2176 grams/ml and the ethylene glycol, 1.1155 grams/ml. Three mixtures of the saturated solution with ethylene glycol were then made. One contained exactly 8 ml. of the solution and exactly 2 ml. of the ethylene glycol, the second exactly 6 ml. of solution and exactly 4 ml. of ethylene glycol, the third exactly 5 ml. of each. The mixtures were placed in test tubes to a depth of about 2 inches and about 20 granular particles of poly(ethylene oxide) having a weight average molecular weight of about four million were placed in each test tube and mixed. The test tubes were observed for a few days. The particles in tube one migrated to the surface of the liquid, in tube two no migration either to the bottom or top took place, and in tube three the particles settled to the bottom. The density of the liquid in tube two is 1.177. Therefore, the poly(ethylene oxide) particles utilized have this identical density. With this procedure the density of particulate poly(ethylene oxide) is determined and the density of the liquid vehicle is then matched to this experimentally determined density value.

EXAMPLE II

This example illustrates a typical prior art formulation for a hydrodynamic drag reducing slurry of particulate poly(ethylene oxide). The active polymer is a polyethylene oxide having a molecular weight of about three million as determined from intrinsic viscosity data and having a particulate size distribution as characterized by 99 weight per cent through 20 mesh, 65 percent through 100 mesh and 45 percent through 200 mesh.

Formulation 22 weight per cent active polymer 5 percent colloidal silica thickening agent (0.007 micron, 325 ± 25 square meters per gram).

73 percent propylene glycol.

The above formulation was found to have an initial viscosity of 54,000 cps. (Brookfield Viscometer at 20°C.) and was found to be stable after twelve months (it contains propylene glycol in about 65 percent excess over void volume).

EXAMPLE III

This example illustrates a typical prior art formulation similar to Example II but having a reduced level of colloidal silica thickening agent. The same active polymer and thickening agent described in Example II are used.

Formulation 22 weight per cent active polymer.

2 weight per cent colloidal silica thickening agent.

76 weight per cent propylene glycol.

The above formulation was found to have an initial viscosity of 8,500 cps. (Brookfield Viscometer at 20°C.) It stratified into a polymer particle-rich lower layer and a propylene glycol-rich top layer after five months storage. It contains propylene glycol in 73 percent excess over that required to fill polymer void volume.

EXAMPLE IV

This example illustrates a formulation for a poly(ethylene oxide) hydrodynamic slurry as prepared by this new invention. The active polymer is identical in molecular weight and particle size distribution to that described in Example II. The thickening agent is also as described in Example II.

Formulation 22 per cent active polymer 1.5 per cent colloidal silica thickening agent.

19.0 per cent propylene glycol.

57.5 per cent glycerine.

The above formulation was found to have an initial viscosity of 4,600 cps. (Brookfield Viscometer, 20°C.) It was found to be stable after twelve months. The liquid vehicle is 49 percent excess over that required to fill the void volume.

As will be seen from a comparison of Examples II and IV, the same active polymer loading of 22 per cent active polymer, and the same degree of stability of twelve months of shelf life, free from signs of stratification, were obtained. It is also apparent from Example IV that a much more fluid slurry is obtained (i.e., 4,600 cps. versus 54,000 cps., in Example II). The reduced viscosity of the slurry of Example IV is attributable to the lower amount of thickening agent required. The slurry of Example IV has superior handling, pouring and pumping characteristics because of the matched density formulation of Example IV, which are attributed to a lower viscosity, i.e., 4,600 cps. versus 54,000 cps. In addition, because of the higher viscosity of the liquid vehicle in Example IV, there is a reduced tendency for the liquid vehicle to bleed out under compaction. (Note that the 20°C. viscosity of propylene glycol is 60 cps. and for glycerine it is 1,000 cps.; the liquid vehicle in Example IV is about 3 parts by weight of glycerine to 1 part by weight of propylene glycol. Moreover, the slurry of Example IV is more resistant to thermal gelation than the slurry of Example II. When 25 ml. aliquots of Example II and Example IV formulation were placed in separated test tubes and subjected to a gradual increase in temperature in an oil bath, the single vehicle slurry (Example II) became a rigid gel at 117°F. whereas the matched density slurry (Example IV) remained fluid at 117°F. and did not become a rigid gel until 131°F. was reached.

From the data in Example III, it will be seen that employment of lower amounts of thickening agents in prior art formulations (2 percent in Example III as contrasted to 5 percent in Example II) results in poor stability of the slurry.

The experimental technique illustrated in Example I for determining the density of the specific lot of poly(ethylene oxide) was employed and used to derive the ratio of glycerine to propylene glycol cited in Example IV.

EXAMPLE V

A conventional slurry formulation containing a reduced level of active particulate poly(ethylene oxide) was prepared utilizing as the active polymer and thickening agent those similar to that described in Example II.

Formulation
  8.0 weight per cent active polymer.
  8.0 weight per cent colloidal silica thickening agent.
  84.0 weight per cent propylene glycol.

The above formulation having propylene glycol in 425 percent over that required to fill the void volume was found to have a viscosity of 54,000 cps. (Brookfield Viscometer at 25°C.). It was found to be stable for six months, however, the slurry stratified prior to twelve months. When the freshly prepared slurry was proportioned into a flowing stream of water considerable undesirable foaming was observed. This problem was believed related to the high level of colloidal silica thickener was reduced below 8.0 weight per cent, slurry stratification occurred before six months.

EXAMPLE VI

This example demonstrates the advantages of the present invention by utilizing a slurry having a reduced level of active poly(ethylene oxide). The active polymer and thickening agent are the same as that described in Example II.

Formulation
  8.0 weight per cent active polymer.
  1.8 weight per cent colloidal silica thickener.
  22.5 weight per cent propylene glycol.
  66.7 weight per cent glycerine.

The slurry having liquid vehicle in 375 percent excess over void volume requirements, was observed to have an initial viscosity of 2,600 cps. (Brookfield Viscometer, 25°C.) and no signs of stratification were observed after 1 year storage. No discernible foam was observed when the slurry was proportioned into a flowing stream of water.

By comparing Example VI with Example V it can be seen that the use of the density match concept imparts long term stability to slurries of low polymer loading with significantly better pumping characteristics.

The following Examples VII–XIII serve to illustrate that a stable slurry can be obtained either by matching the density of the liquid vehicle mixture exactly to, or very closely to, that of the poly(ethylene oxide). In all of the examples below the poly(ethylene oxide) and thickening agent are the same as described in Example II; furthermore by the use of the experimental technique cited in Example I, it is found to have a density of 1.1777 grams/ml. All formulations given in the following table have the common character of:

22.0 weight per cent poly(ethylene oxide).
  1.5 weight per cent colloidal silica thickener.
  76.5 weight per cent liquid vehicle (a mixture of glycerine and propylene glycol).

The composition of the liquid vehicle, the resultant density of the liquid vehicle mixture, the comparison of the liquid vehicle density to the density of the dispersed poly(ethylene oxide), and the resultant stability or resistance against stratification after 12 month's storage at ambient temperature are also included in Table I below:

TABLE I

A SERIES OF MATCHED DENSITY POLY(ETHYLENE OXIDE) SLURRY FORMULATIONS DESIGNED TO ILLUSTRATE HOW PRECISELY THE DENSITY MUST BE MATCHED

| Example | Wgt. Ratio Glycerine Propylene Glycol | Wgt. %* Glycerine | Wgt. %* Propylene Glycol | Density of Liquid Vehicle Grams/C.C. | % Difference** | Free From Stratification After One Year |
|---|---|---|---|---|---|---|
| VII | 0.667 | 30.60 | 45.90 | 1.1181 | −5.33 | No |
| VIII | 1.000 | 38.25 | 38.25 | 1.1395 | −3.35 | Yes |
| IX | 2.000 | 51.00 | 25.50 | 1.1770 | −0.05 | Yes |
| X | 3.000 | 57.38 | 19.12 | 1.1971 | +1.65 | Yes |
| XI | 4.000 | 61.20 | 15.30 | 1.2089 | +2.65 | Yes |
| XII | 5.667 | 65.02 | 11.48 | 1.2213 | +3.70 | No |
| XIII | 8.000 | 68.00 | 8.50 | 1.2311 | +4.53 | No |

* Based on the total weight of slurry formulation.
**Calculated as follows: Density of the liquid vehicle − density of the poly(ethylene oxide)/Density of the poly(ethylene oxide) (100)

EXAMPLE XIV

A conventional moyno displacement pump was used for several runs over a six month period to pump the slurry of Examples II and IV. Example II is a single vehicle prior art slurry whereas Example IV is a slurry according to the present invention.

The slurry in each case, was pumped through 5 feet of copper tube of about ⅜ inch internal diameter which exited through an injection port at a rate of about 0.1 gal./min. against a back pressure of about 80 psi into a flowing stream of water. The prior art slurry failed quite frequently, whereas the matched density slurry (Example IV) showed no signs of failure. The failure of the prior art slurry was attributed to the observed blocked lines due to formation of rigid gels and/or regions of compacted dry poly(ethylene oxide) solids.

What is claimed is:

1. A stable slurry formulation which comprises:
   a. particulate water-soluble ethylene oxide polymer which has an average molecular weight greater than about 500,000 and a density of about 1.15 to about 1.26;
   b. an inert liquid vehicle which is a non-solvent for said ethylene oxide polymer, said vehicle being a mixture of at least two mutually soluble liquids, or a solution of a solid in a liquid, one component of said mixture having a density lower than that of the ethylene oxide polymer and being selected from the group consisting of propylene glycol, 1,3-butylene glycol, 1.6-hexylene glycol, ethylene glycol, 2-methyl-pentane-2.4-diol, dipropylene glycol, butane diol, poly(ethylene oxides) of molecular weight of about 200 to about 600, and water-soluble liquid poly(alkylene oxides) about 200 to about 20,000 molecular weight and the other component of said mixture having a density higher than that of the ethylene oxide polymer and being selected from the group consisting of glycerine, 1, 2, 3, 4, 5, 6 hexane hexol, 1, 2, 3, 4 butane tetrol, pentaerythritol and ethylene carbonate characterized in that the density of the liquid vehicle is from about 96.5 percent to about 103.5 percent of the density of said ethylene oxide polymer, said vehicle being present at a total volume per unit volume of polymer powder which exceeds the void volume of said ethylene oxide polymer by at least 3 percent but by less than 500 percent preferably by at least 45 percent but by not more than 350 percent, and
   c. a thickening agent which is non-reactive with said ethylene oxide polymer and said liquid vehicle and which is employed in an amount of about 0 percent to about 3 ½ based on the weight of the slurry formulation.

2. The stable slurry formulation of claim 1 wherein the density of said liquid vehicle is from about 98 percent to about 102 percent of the density of said ethylene oxide polymer.

3. The stable slurry formulation of claim 1 wherein the density of said liquid vehicle is about 100 percent of the density of said ethylene oxide polymer.

4. The stable slurry formulation of claim 1 wherein said particulate ethylene oxide polymer possesses an average molecular weight in the range from about 1,000,000 to about 12,000,000 and is of the group consisting of poly(ethylene oxide) and copolymers of ethylene oxide and olefin monoxides.

5. The stable slurry formulation of claim 4 wherein said ethylene oxide polymer is of the group consisting of poly(ethylene oxide) and ethylene oxide/propylene oxide copolymers.

6. The stable slurry formulation of claim 5 wherein said ethylene oxide polymer is poly(ethylene oxide).

7. The stable slurry formulation of claim 1 wherein said vehicle is present at a total volume per unit volume of polymer powder which exceeds the void volume of said ethylene oxide polymer by at least 45 percent but by not more than 350 percent.

8. The stable slurry formulation of claim 1 wherein the liquid vehicle is a mixture of propylene glycol and glycerol.

9. The stable slurry formulation of claim 8 wherein the density of said liquid vehicle is from about 98 percent to about 102 percent of the density of said ethylene oxide polymer.

10. A stable slurry formulation which comprises:
    a. poly(ethylene oxide) having an average molecular weight greater than about 500,000 and a density of about 1.15 to about 1.26;
    b. an inert liquid vehicle containing a mixture of propylene glycol and glycerol each of said propylene glycol and glycerol being employed in amounts such as to provide a density of said liquid vehicle which is from about 98 percent to about 102 percent of the density of said poly(ethylene oxide) said vehicle being present at a total volume per unit volume of polymer powder which exceeds the void volume of said ethylene oxide polymer by at least 45 percent but by not more than 350 percent; and
    c. a thickening agent which is non-reactive with said liquid vehicle and said poly(ethylene oxide) polymer and which is employed in an amount of from about 0 percent to about 3 ½ percent based on the total weight of the slurry formulation.

11. The stable slurry formulation of claim 10 wherein the density of said vehicle is 100 percent of the density of said poly(ethylene oxide).

12. The stable slurry formulation of claim 11 wherein said thickening agent is colloidal silica.

* * * * *